(12) United States Patent
Nambu et al.

(10) Patent No.: US 11,453,207 B2
(45) Date of Patent: Sep. 27, 2022

(54) HEAT-SHRINKABLE MULTILAYER FILM

(71) Applicant: Kureha Corporation, Tokyo (JP)

(72) Inventors: Shota Nambu, Tokyo (JP); Ichiro Kitada, Tokyo (JP); Tadayoshi Itoh, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 20 days.

(21) Appl. No.: 16/346,173

(22) PCT Filed: Oct. 18, 2017

(86) PCT No.: PCT/JP2017/037723
§ 371 (c)(1),
(2) Date: Apr. 30, 2019

(87) PCT Pub. No.: WO2018/088152
PCT Pub. Date: May 17, 2018

(65) Prior Publication Data
US 2020/0055290 A1    Feb. 20, 2020

(30) Foreign Application Priority Data

Nov. 9, 2016  (JP) .............................. JP2016-218714

(51) Int. Cl.
| B32B 27/08 | (2006.01) |
| B32B 27/34 | (2006.01) |
| B32B 27/36 | (2006.01) |
| B65D 65/40 | (2006.01) |

(52) U.S. Cl.
CPC .............. *B32B 27/08* (2013.01); *B32B 27/34* (2013.01); *B32B 27/36* (2013.01);
(Continued)

(58) Field of Classification Search
CPC ......... B32B 27/34; B32B 27/08; B32B 27/36; B32B 2307/31; B32B 2307/736;
(Continued)

(56) References Cited

U.S. PATENT DOCUMENTS 10,843,443 B2 * 11/2020 Broadus ................ B32B 27/325
2002/0061412 A1    5/2002 Ueyama et al.
(Continued)

FOREIGN PATENT DOCUMENTS

JP    2002172746 A    6/2002
JP    2014200968 A    10/2014
(Continued)

OTHER PUBLICATIONS

International Search Report for PCT/JP2017/037723 with dated Jan. 9, 2018.
(Continued)

*Primary Examiner* — Ellen S Hock
(74) *Attorney, Agent, or Firm* — Birch, Stewart, Kolasch & Birch, LLP (57) ABSTRACT

Provided is a heat-shrinkable multilayer film including: an outer surface layer including a thermoplastic resin; an intermediate layer including a polyamide resin; and an inner surface layer including a sealable resin; the total thickness of the heat-shrinkable multilayer film being from 95 to 160 μm; the thickness of the intermediate layer including the polyamide resin being from 17 to 47 μm; the thickness of the inner surface layer being 55 μm or greater; and the ratio of the thickness of the intermediate layer including the polyamide resin to the total thickness of the heat-shrinkable multilayer film being from 18 to 29%. The heat-shrinkable multilayer film of the present invention has high strength and excellent flexibility. Therefore, the heat-shrinkable multilayer film of the present invention is easily stretched and (Continued)

formed, and can be suitably used as a variety of packaging materials including a food packaging material.

12 Claims, 1 Drawing Sheet

(52) U.S. Cl.
CPC ..... *B32B 2307/31* (2013.01); *B32B 2307/736* (2013.01); *B32B 2377/00* (2013.01); *B65D 65/40* (2013.01); *Y10T 428/13* (2015.01); *Y10T 428/1352* (2015.01); *Y10T 428/1379* (2015.01)

(58) Field of Classification Search
CPC .. B32B 2377/00; B65D 75/002; B65D 65/40; Y10T 428/13; Y10T 428/1352; Y10T 428/1379
USPC ....................... 428/34.1, 35.7, 212
See application file for complete search history.

(56) References Cited

U.S. PATENT DOCUMENTS

2003/0157350 A1  8/2003  Ueyama et al.
2009/0136726 A1* 5/2009 Ishii ................. B32B 27/34
                                                    428/212

FOREIGN PATENT DOCUMENTS

WO    WO2001098081 A2    12/2001
WO    WO2007094144 A1    8/2007

OTHER PUBLICATIONS

Translation of the International Search Report for PCT/JP2017/037723 with dated Jan. 9, 2018.
Written Opinion of the International Search Authority for PCT/JP2017/037723 with dated Jan. 9, 2018.
Office Action dated Jul. 2, 2019, in Australian Patent Application No. 2017359100.
English translation of Written Opinion of the International Searching Authority dated Jan. 9, 2018, in PCT/JP2017/037723.
Extended European Search Report, dated Oct. 18, 2019, for European Application No. 17869566.4.
Chinese Office Action for Appl. No. 201780048761.6 dated Apr. 23, 2020 w/ English translation.
Chinese Office Action, dated Oct. 12, 2020, for Chinese Application No. 201780048761.6, with an English translation.

* cited by examiner

HEAT-SHRINKABLE MULTILAYER FILM

TECHNICAL FIELD

The present invention relates to a heat-shrinkable multilayer film, and particularly relates to a heat-shrinkable multilayer film having high strength and excellent flexibility.

BACKGROUND ART

As package processing techniques for foods such as fresh meat, ham, and sausages, and other products, techniques, in which a heat-shrinkable multilayer film is formed into a bag or pouch by a bag-forming machine and then filled with contents, or either the contents as is or the contents loaded on a tray are automatically packaged during bag-forming processing, have been widely used in the related art. Thus, the characteristics required for such a film for packaging are diverse, and there is a demand to achieve an excellent balance of various properties such as heat-shrinkability, strength, flexibility, heat resistance, high-temperature creep resistance, moldability, suitability for various types of packaging, gas barrier property, water vapor barrier property, and transparency. Among these characteristics, it is difficult to ensure the balance between the strength and the flexibility. When the strength is increased, the flexibility is decreased, and when the flexibility is increased, the strength is decreased.

As a literature related to these characteristics, for example, JP 2002-172746 A (Patent Document 1) discloses a heat-shrinkable multilayer film including an outer surface layer (a) including a thermoplastic resin, an intermediate layer (b) including a polyamide resin, and an inner surface layer (c) including a sealable resin; the thermoplastic resin constituting the outer surface layer (a) being a polyester resin or a polyolefin resin; the polyamide resin constituting the intermediate layer (b) being a mixture of 85 to 60 wt. % of an aliphatic polyamide resin and 15 to 40 wt. % of an aromatic polyamide copolymer resin that is a copolymer of an aliphatic diamine/isophthalic acid and an aliphatic diamine/terephthalic acid; the sealable resin constituting the inner surface layer (c) being substantially a copolymer of ethylene and α-olefin having a density of less than 0.915; the hot water shrinkage ratio at 80° C. being 30% or greater in both the machine direction and the transverse direction, and 35% or greater in at least one of the machine direction or the transverse direction; and the heat-shrinkable multilayer film being heat-treated after biaxial stretching.

However, the heat-shrinkable multilayer film described in Patent Document 1 has high strength, but does not always have sufficient flexibility. Also, a film having a higher strength has been desired.

WO 2007/094144 (Patent Document 2) discloses a technique of producing a heat-shrinkable multilayer film that satisfies various properties such as heat-shrinkability, tensile strength, heat resistance, moldability, suitability for various types of packaging, gas barrier property, water vapor barrier property, and visibility at a high level, and particularly has excellent heat resistance and high-temperature creep resistance by a combination of an outer surface layer (a) including a thermoplastic resin, a first intermediate layer (b1) including a polyamide resin having a very limited composition, a second intermediate layer (b2) including a thermoplastic resin having a specific composition, and an inner surface layer (c) including a polyolefin resin.

However, the heat-shrinkable multilayer film described in Patent Document 2 does not achieve both high strength and high flexibility sufficiently.

CITATION LIST

Patent Literature

Patent Document 1: JP 2002-172746 A
Patent Document 2: WO 2007/094144

SUMMARY OF INVENTION

Technical Problem

The present invention was conceived in light of the problems of the known arts, and an object of the present invention is to provide a heat-shrinkable multilayer film having high strength and excellent flexibility.

Solution to Problem

The present inventors found that a favorable balance between strength and flexibility can be achieved based on the total thickness of the film, the thickness of a polyamide resin layer serving as an intermediate layer, the thickness of the inner surface layer, and the ratio of the total thickness of the film and the thickness of the intermediate layer, and thereby succeeded in developing a film having high strength and excellent flexibility.

That is, the present invention is a heat-shrinkable multilayer film including: an outer surface layer including a thermoplastic resin; an intermediate layer including a polyamide resin; and an inner surface layer including a sealable resin; the total thickness of the heat-shrinkable multilayer film being from 95 to 160 μm; the thickness of the intermediate layer including the polyamide resin being from 17 to 47 μm; the thickness of the inner surface layer being 55 μm or greater; and the ratio of the thickness of the intermediate layer including the polyamide resin to the total thickness of the heat-shrinkable multilayer film being from 18 to 29%.

The heat-shrinkable multilayer film has a puncture strength from an inner surface layer side at 23° C., 50% RH of 21 N or greater, and has a 2.5% secant modulus in both the machine direction (MD) and the transverse direction (TD) of 100 to 520 MPa.

The heat-shrinkable multilayer film preferably includes a barrier layer including EVOH.

In the heat-shrinkable multilayer film, the polyamide resin constituting the intermediate layer is preferably a mixture of an aliphatic polyamide resin and an aromatic polyamide copolymer resin that is a copolymer of an aliphatic diamine/isophthalic acid and an aliphatic diamine/terephthalic acid, and the sealable resin constituting the inner surface layer is preferably a polyethylene resin.

The heat-shrinkable multilayer film can be suitably used for packaging.

Advantageous Effects of Invention

The heat-shrinkable multilayer film of the present invention has high strength and excellent flexibility. Therefore, the heat-shrinkable multilayer film of the present invention is easily stretched and formed, and can be suitably used as a variety of packaging materials including a food packaging material.

DESCRIPTION OF EMBODIMENTS

The heat-shrinkable multilayer film according to an embodiment of the present invention includes: an outer surface layer including a thermoplastic resin; an intermediate layer including a polyamide resin; and an inner surface layer including a sealable resin. The total thickness of the heat-shrinkable multilayer film is from 95 to 160 µm; the thickness of the intermediate layer including the polyamide resin is from 17 to 47 µm; the thickness of the inner surface layer is 55 µm or greater; and the ratio of the thickness of the intermediate layer including the polyamide resin to the total thickness of the heat-shrinkable multilayer film is from 18 to 29%.

The strength of the film can be increased by increasing the thickness of the film, but when the thickness of the film is increased, the flexibility decreases. This causes problems in handling, such as generation of pinholes during transportation at low temperatures, and poor handleability due to hardening of the film. In addition, a thick film is difficult to be stretched and formed. Therefore, simply increasing the film thickness cannot ensure both the strength and the flexibility.

The present inventors found that to ensure the strength of the film, the total thickness of the film and the thickness of the polyamide resin layer serving as the intermediate layer are preferably increased; however, to ensure the flexibility, the thickness of the polyamide resin layer needs to be decreased; and even in a case where the thickness of the intermediate layer is decreased, the strength can be maintained by increasing the thickness of the inner surface layer serving as the sealant layer. In addition, the stretching ratio of the film can be increased by increasing the ratio of the inner surface layer, and thus the strength of the film can be increased. Specifically, it was found that, in a film having a specific thickness, decreasing the thickness of the polyamide resin layer serving as the intermediate layer by 1 µm and increasing the thickness of the inner surface layer by approximately 3 µm can achieve the balance between the strength and the flexibility. Based on these findings, the total thickness of the film, the thickness of the polyamide resin layer serving as an intermediate layer, the thickness of the inner surface layer, and the ratio of the total thickness of the film and the thickness of the intermediate layer are determined as described below, to obtain the film having high strength and excellent flexibility according to an embodiment of the present invention.

The total thickness of the heat-shrinkable multilayer film according to an embodiment of the present invention is from 95 to 160 µm, preferably from 95 to 150 µm, and more preferably from 95 to 140 µm. In a case where the total thickness is less than 95 µm, the strength is difficult to be ensured. In a case where the total thickness is greater than 160 µm, problems may arise during production.

The thickness of the intermediate layer including a polyamide resin is from 17 to 47 µm, preferably from 18 to 44 µm, and more preferably from 19 to 41 µm. In a case where the thickness is less than 17 µm, the strength cannot be ensured, and in a case where the thickness is greater than 47 µm, the flexibility cannot be ensured.

The thickness of the inner surface layer is 55 µm or greater, preferably from 55 to 102 µm, and more preferably from 55 to 87 µm. In a case where the thickness of the inner surface layer is less than 55 µm, the flexibility is difficult to be ensured.

The thickness of the intermediate layer including a polyamide resin to the total thickness of the heat-shrinkable multilayer film is from 18 to 29%, preferably from 18 to 28%, and more preferably from 18 to 27%. In a case where the ratio of the thickness of the intermediate layer increases, the flexibility cannot be ensured, and in a case where the ratio decreases, the strength cannot be ensured.

In the most preferred configuration of an embodiment of the present invention, the total thickness of the heat-shrinkable multilayer film is from 95 to 140 µm; the thickness of the intermediate layer including the polyamide resin is from 19 to 41 µm; the thickness of the inner surface layer is from 55 to 87 µm; and the ratio of the thickness of the intermediate layer including the polyamide resin to the total thickness of the heat-shrinkable multilayer film is from 18 to 27%.

Each layer constituting the heat-shrinkable multilayer film according to an embodiment of the present invention, the properties of the film, and the like will be described in detail.

Outer Surface Layer Including Thermoplastic Resin

As the thermoplastic resin constituting the outer surface layer, it is preferable to use a resin that has appropriate stretchability and prevents moisture from permeating to the intermediate layer in a laminated state with an intermediate layer including a polyamide resin described below. Using such a thermoplastic resin prevents moisture from permeating to the intermediate layer including a polyamide resin which tends to absorb moisture, and can prevent the problem that when freezing and refrigerating the multilayer film, moisture freezes, and this reduces the strength of the multilayer film. Examples of such a thermoplastic resin include a polyester resin, a polyolefin resin, and the like, and a polyester resin is particularly preferable from the perspective of transparency, heat resistance, surface glossiness, strength, flexibility, mechanical suitability, and formability.

Examples of the polyester resin ("PET") include an aliphatic polyester resin, an aromatic polyester resin and the like. The polyester resin can be obtained by, for example, polymerizing a dicarboxylic acid and a diol.

The dicarboxylic acid is not particularly limited as long as polyester can be synthesized by an ordinary production method. Examples thereof include terephthalic acid, isophthalic acid, adipic acid, oxalic acid, malonic acid, succinic acid, azelaic acid, sebacic acid, phthalic acid, 5-t-butylisophthalic acid, naphthalene dicarboxylic acid, diphenylether dicarboxylic acid, cyclohexane dicarboxylic acid, and dimer acid including a dimer of unsaturated fatty acid. Furthermore, one type of the dicarboxylic acid may be used alone, or two or more types may be used in combination.

The diol component is not particularly limited as long as polyester can be synthesized by an ordinary production method. Examples thereof include ethylene glycol, propylene glycol, tetramethylene glycol, neopentyl glycol, hexamethylene glycol, diethylene glycol, polyalkylene glycol, 1,4-cyclohexane dimethanol, and 2-alkyl-1,3-propanediol. One type of the diol may be used alone, or two or more types may be used in combination.

Among such polyester resins, an aromatic polyester resin produced using an aromatic dicarboxylic acid is preferable from the perspective of moldability and film processability. An aromatic polyester resin obtained by using at least one type selected from the group consisting of terephthalic acid and isophthalic acid as a dicarboxylic acid, and using a diol having 10 carbons or less as a diol, for example, polyethylene terephthalate and polybutylene terephthalate are more preferable. An aromatic polyester resin, for example, "Bellpet IFG-8L" available from Bell Polyester Products, Inc., obtained using a terephthalic acid and an isophthalic acid as a dicarboxylic acid and using ethylene glycol as a diol is particularly preferable. One type of the polyester resin may be used alone, or two or more types may be used in combination.

The polyester resin preferably has an intrinsic viscosity of approximately 0.6 to 1.2.

Examples of the polyolefin resin ("PO") include an ethylene homopolymer; a propylene homopolymer; a copolymer of linear α-olefins having from 2 to 8 carbons, such as linear very low density polyethylene (VLDPE) and linear low density polyethylene (LLDPE); and a polyolefin copolymer such as a propylene-ethylene copolymer, a propylene-ethylene-butene-1 copolymer, an ethylene-vinyl acetate copolymer (EVA), an ethylene-acrylic acid copolymer (EAA), an ethylene-methacrylic acid copolymer (EMAA), an ethylene methyl acrylate copolymer (EMA), an ethylene-ethyl acrylate copolymer (EEA), and an ethylene-butyl acrylate copolymer (EBA). One type of the polyolefin resin may be used alone, or two or more types may be used.

Examples of the catalyst used in the production of these polyolefin resins include known catalysts (Ziegler-Natta catalyst), and single-site catalysts (metallocene catalysts).

Intermediate Layer Including Polyamide Resin

The polyamide resin ("PA") constituting the intermediate layer is not particularly limited as long as a film layer can be formed, but a mixture of an aliphatic polyamide resin and an aromatic polyamide copolymer resin (sometimes referred to as "nylon 6I-6T") that is a copolymer of an aliphatic diamine/isophthalic acid and an aliphatic diamine/terephthalic acid is preferable. The heat-shrinkable multilayer film according to an embodiment of the present invention including such a mixture as a polyamide resin can stably achieve a high hot water shrinkage ratio at a temperature of 80° C. to 90° C.

In this mixture, the content of the aliphatic polyamide resin is preferably from 90 to 85 wt. %, and more preferably from 88 to 86 wt. %. The content of the aromatic polyamide copolymer resin is preferably from 10 to 15 wt. %, and more preferably from 12 to 14 wt. %. When the content of the aliphatic polyamide resin is too high, sufficient hot water shrinkage ratio is unlikely to be achieved, and conversely, when the content is too low, sufficient flexibility is unlikely to be achieved.

Examples of the aliphatic polyamide resin include an aliphatic polyamide homopolymer and an aliphatic polyamide copolymer. Examples of the aliphatic polyamide homopolymer include nylon 6, and nylon 66. Examples of the aliphatic polyamide copolymer include nylon 6-66, nylon 6-69, nylon 6-610, nylon 66-610, and nylon 6-12. Nylon 6-66 is particularly preferable as the aliphatic polyamide resin in that it is well miscible with the aromatic polyamide copolymer resin.

One type of the aliphatic polyamide resin may be used alone, or two or more types may be used in combination.

The aromatic polyamide copolymer resin is preferably a copolymer obtained from acid components including from 40 to 98 mol % of an isophthalic acid and from 2 to 60 mol % of a terephthalic acid, and an aliphatic diamine including from 50 to 100 mol % of hexamethylene diamine, and, optionally, from 0 to 50 mol % of bis(p-amino-cyclohexyl) methane. The aromatic polyamide copolymer resin is normally amorphous, and in a case where it is crystalline, the crystallinity is very small, and the melting point is not clear. Nylon 6I-6T is particularly preferable as the aromatic polyamide copolymer resin.

One type of the aromatic polyamide copolymer resin may be used alone, or two or more types may be used in combination.

Inner Surface Layer

The resin that constitutes the inner surface layer is not particularly limited as long as it is a sealable resin, but a resin having an appropriate sealing strength at from 90 to 250° C. is preferable, and examples include a polyolefin resin such as a polyethylene resin. Examples of such a polyolefin resin ("PO") include one similar to the polyolefin resin exemplified as the thermoplastic resin component constituting the outer surface layer. Among these polyolefin resins, an ethylene homopolymer; a propylene homopolymer; and a polymer of α-olefins having from 2 to 8 carbons, such as a very low density polyethylene (VLDPE), and a linear low density polyethylene (LLDPE) are preferable, and a VLDPE is more preferable, from the perspective of a water vapor barrier property and a sealing property.

Other Layers

The heat-shrinkable multilayer film according to an embodiment of the present invention may include a barrier layer having a gas barrier property. The barrier layer includes a gas barrier resin. Examples of the gas barrier resin include an ethylene-vinyl alcohol copolymer (that is, a saponified product of an ethylene-vinyl acetate copolymer, "EVOH"), a poly(m-xylene adipamide) resin (nylon "MXD6"), and an aromatic polyamide copolymer resin which is a copolymer of an aliphatic diamine/isophthalic acid and an aliphatic diamine/terephthalic acid ("nylon 6I-6T").

A mixture obtained by mixing the resin in accordance with the gas barrier property required for various packaging materials can be used. In particular, Nylon MXD6 and Nylon 6I-6T are often used in a mixture from the perspective of stretchability.

When the EVOH is mixed with the polyamide resin and is used for the barrier layer including the gas barrier resin, a high heat shrinkage ratio can be easily achieved. The polyamide resin used herein reacts with EVOH to crosslink, causing a problem about extrusion processability in some cases. Thus, a treatment such as capping a functional group at a terminal may be typically performed on a polyamide resin in order to reduce the reactivity with the EVOH and prevent gelling (for example, "Grilon CF7" available from EMS-CHEMIE Ltd., and Novamid EN nylon, available from Mitsubishi Engineering-Plastics Corporation, used in examples described later). It is also desirable to take into account the prevention of gelling in an extruder or a die.

The heat-shrinkable multilayer film according to an embodiment of the present invention may include an adhesive resin layer. The adhesive resin layer can be provided as an intermediate layer as necessary, for example, in a case where the adhesive strength between the layers is not sufficient. An olefin (co)polymer containing oxygen can be used as an adhesive resin. More preferably, an EVA, an EEA, an EAA, an acid-modified polyolefin (a reaction product of a homopolymer or a copolymer of olefins and the like with an unsaturated carboxylic acid such as maleic acid or fumaric acid, an acid anhydride, an ester, or a metal salt, for example, an acid-modified VLDPE, an acid-modified LLDPE, and an acid-modified EVA) may be used as the adhesive resin. An advantageous example is an olefin resin modified with an acid such as maleic acid or anhydride thereof or the like.

A preferred aspect of the layer configuration of the heat-shrinkable multilayer film according to an embodiment of the present invention will be described.

(1) Polyester resin/adhesive resin/polyamide resin/adhesive resin/sealing resin (2) Polyester resin/adhesive resin/polyamide resin/gas barrier resin/adhesive resin/sealing resin (3) Polyester resin/adhesive resin/polyamide resin/gas barrier resin/polyamide resin/adhesive resin/sealing resin (4) Polyolefin resin/adhesive resin/polyamide resin/adhesive resin/sealing resin (5) Polyolefin resin/adhesive resin/polyamide resin/gas barrier resin/adhesive resin/sealing resin (6) Polyolefin resin/adhesive resin/polyamide resin/gas barrier resin/polyamide resin/adhesive resin/sealing resin To improve a seal performance, an (oxygen-containing) polyolefin (copolymer) layer may be further provided between the adhesive resin layer and the sealing resin layer.

Further, a lubricant, an anti-static agent, or the like can be added to any of the layers. As the lubricant, a behenic acid amide, an oleic acid amide, or an erucic acid amide is preferably added in the form of a masterbatch. The lubricant is preferably added using, for example, a masterbatch containing from 5 to 20 wt. % of the lubricant, in an amount such that the concentration of the lubricant in the layer is from 0.05 to 2 wt. %. The anti-static agent such as a surfactant is typically added in an amount of 0.05 to 2 wt. %, and preferably from 0.1 to 1 wt. % relative to the amount of a resin of the layer to which the anti-static agent is added.

Heat-Shrinkable Multilayer Film

The heat-shrinkable multilayer film according to an embodiment of the present invention has high strength and excellent flexibility as described above.

The heat-shrinkable multilayer film according to an embodiment of the present invention preferably has a puncture strength from an inner surface layer side at 23° C., 50% RH of 21 N or greater, and a 2.5% secant modulus in both the machine direction (MD) and the transverse direction (TD) of 100 to 520 MPa. When the puncture strength from the inner surface layer side is within the range described above, it is possible to ensure a film strength that the film is not damaged due to normal effects received from the contents packaged in the film.

The puncture strength from the inner surface layer side is preferably 21 N or greater, and more preferably 24 N or greater. The upper limit of the puncture strength is not particularly limited, but is normally approximately 50 N.

The 2.5% secant modulus in the machine direction (MD) and the transverse direction (TD) is preferably from 100 to 520 MPa, and more preferably from 100 to 500 MPa.

The heat-shrinkable multilayer film according to an embodiment of the present invention preferably has a puncture strength from the outer surface layer side at 23° C., 50% RH of 30 N or greater, and more preferably 35 N or greater. When the puncture strength from the outer side of the film is within the range described above, it is possible to ensure a film strength that the film is not damaged due to normal effects received from the contents packaged in the film. That is, the heat-shrinkable multilayer film according to an embodiment of the present invention preferably has a 2.5% secant modulus of 100 to 500 MPa, a puncture strength from the inner surface layer side of 24 N or greater, and a puncture strength from the outer surface layer side of 35 N or greater.

Method of Producing Heat-Shrinkable Multilayer Film

The heat-shrinkable multilayer film according to an embodiment of the present invention is produced by laminating and stretching the layers.

The heat-shrinkable multilayer film according to an embodiment of the present invention can be produced by adjusting the total thickness of the film, the thickness of the polyamide resin layer serving as the intermediate layer, and the thickness of the inner surface layer to the numerical range described above according to a known method of producing a multilayer film, and further adjusting the ratio of the total thickness of the film and the thickness of the intermediate layer to be within the numerical range described above.

Figure 1:
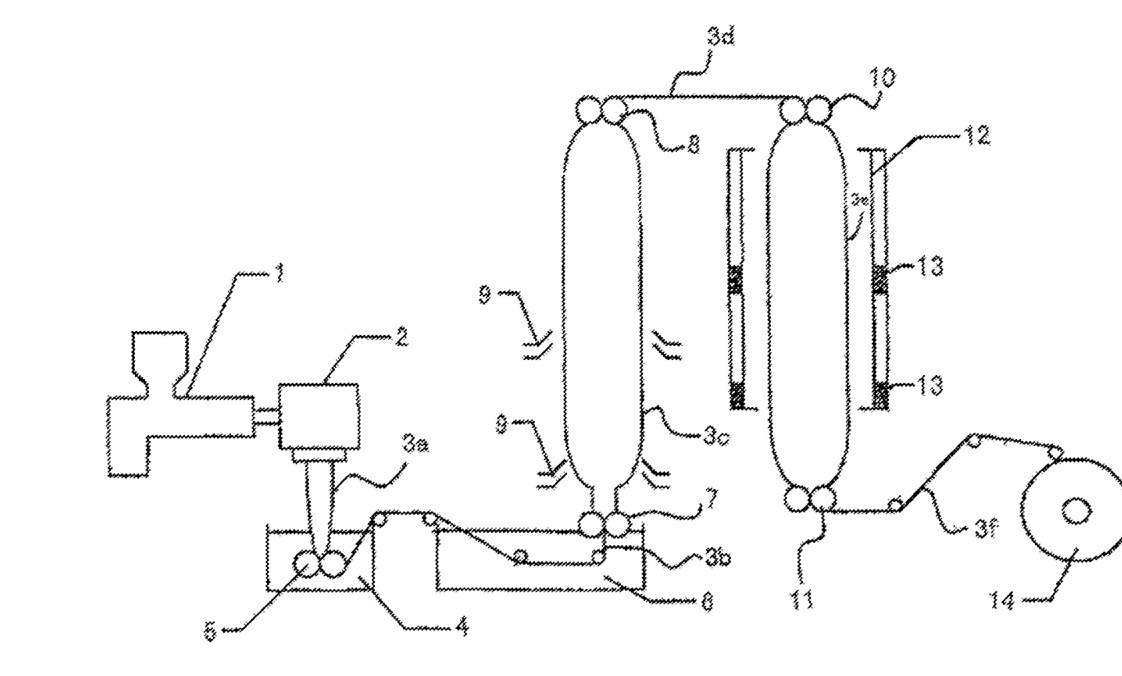
FIG. 1 is a schematic view illustrating an example of the apparatus for producing the heat-shrinkable multilayer film of the present invention.

The heat-shrinkable multilayer film according to an embodiment of the present invention can be produced by using, for example, an apparatus illustrated in FIG. 1. In the apparatus illustrated in FIG. 1, for example, a tubular body (parison) 3a including an outer surface layer, an intermediate layer, and an inner surface layer is co-extruded through an annular die 2 from a number of extruders 1 (only one extruder is illustrated) corresponding to the number of types of laminated resins that constitute the multilayer film. The melted tubular body 3a immediately after co-extrusion is taken up by a pinch roller 5 while being cooled in a water bath 4 to a temperature equal to or lower than the melting point of the resin primarily included in each of the layers, preferably to 20° C. or lower, and more preferably to 15° C. or lower. Then, the film-shaped tubular body 3b that has been taken up (multilayer film) is introduced into a hot water bath 6 at a temperature equal to or lower than the melting point of the resin primarily included in each of the layers, for example, 80 to 95° C. During the introduction of the film-shaped tubular body 3b into the hot water bath 6, an anti-blocking agent represented by soybean oil, a fatty acid ester of glycerin, propylene glycol, and the like is enclosed as necessary. The film-shaped tubular body 3b that has been heated is then drawn upward. A film-shaped tubular body 3b is made into a bubble shape by fluid air introduced between a pair of pinch rollers 7 and 8, and formed into a tubular film 3c during inflation. Then, the tubular film 3c is simultaneously biaxially stretched in the machine direction (MD) and the transverse direction (TD) with stretching ratios of preferably 2.5 to 4, more preferably 2.5 to 3.5, and particularly preferably 2.8 to 3.5 while being cooled with a cooling airing 9 at 10 to 20° C. Then, the tubular film 3d after stretching is drawn downward, and again made into a bubble shape by fluid air introduced between a pair of pinch rollers 10 and 11, and a tubular film 3e is formed during heat treatment and then held inside a heat treatment cylinder 12. Then, steam is blown from the nozzles 13 of the heat treatment cylinder 12, alone or together with air, and the tubular film 3e during heat treatment is heat-treated preferably at 50 to 100° C., and more preferably at 60 to 95° C. The heat treatment is performed for approximately 1 to 20 seconds, and preferably for approximately 1.5 to 10 seconds. Then, the tubular film 3e during heat treatment is relaxed such that the relaxation ratios in the machine direction (MD) and the transverse direction (TD) are from 2 to 40%, and preferably from 5 to 30%. The tubular film 3f after such relaxing heat treatment corresponds to the heat-shrinkable multilayer film according to an embodiment of the present invention, and is wound onto a winding roller 14.

EXAMPLES

The present invention will be described in further detail hereafter based on Examples and Comparative Examples, but the present invention is not limited to the following examples.

The resins used in the Examples and Comparative Examples are summarized in Table 1 below together with the abbreviations.

TABLE 1

| Description in Examples | Resin | Grade | Manufacturer |
|---|---|---|---|
| Co-PET | PET | BELLPET IFG-8L | Bell Polyester Products, Inc. |
| MB-1 | Lubricant masterbatch | MB60 | Nippon Pigment Co. Ltd. |
| Ny6 | Ny6 | Ultramid B40L | BASF |
| Ny6-66 | Ny6-66 | UBE Nylon 5034 B | Ube Industries, Ltd. |
| A-Ny | Ny6I-6T | Selar PA3426 | Dupont |
| EVOH | EVOH | Eval G156B | Kuraray |
| LLDPE | LLDPE | DOWLEX SC2107GC | The Dow Chemical Company |
| VLDPE1 | VLDPE | ATTANE 4606 GC | The Dow Chemical Company |
| VLDPE2 | VLDPE | ATTANE SL4100 | The Dow Chemical Company |
| MB-2 | Anti-blocking agent masterbatch | SUMIKATHENE A-26 | Sumitomo Chemical Co., Ltd. |
| ad | MA-g-PE | Admer SF730 | Mitsui Chemicals, Inc. |

Example 1

Using the apparatus illustrated in FIG. 1, resins were each extruded by a plurality of extruders 1 such that the layers have a configuration in such an order of a mixture of 88 wt. % Co-PET and 12 wt. % MB-1/ad/a mixture of 85 wt. % Ny6-66 and 15 wt. % A-Ny/EVOH/ad/a mixture of 90 wt. % VLDPE and 10 wt. % MB-2 from the outer side to the inner side of the film, and each of the layers has a given thickness. The melted resins were introduced into an annular die 2, melted and joined to form the layer configuration described above, and then co-extruded. The melted tubular body 3a discharged from the outlet of the annular die 2 was wound onto a pinch roller 5 while rapidly cooling the tubular body 3a to approximately 16° C. in a water bath 4 to form a film. Next, the film-shaped tubular body 3b was passed through a hot water bath 6 at 90° C. to form a bubble-shaped tubular film 3c during inflation. Then, the bubble-shaped tubular film 3c was simultaneously biaxially stretched with stretching ratios of 3.1 in the machine direction (MD) and 3.4 in the transverse direction (TD) by the inflation method while being cooled with an airring 9 at a temperature of 15 to 20° C. Then, the tubular film 3d after stretching was introduced into a heat treatment cylinder 12 having a length of approximately 2 m to form a bubble-shaped tubular film 3e during heat treatment. Thereafter, the tubular film 3e was heated to 68° C. by steam blown from nozzles 13, then heat-treated for approximately 2 seconds while being relaxed at 10% in the machine direction and 10% in the transverse direction, and thereby a tubular film 3f after heat treatment (heat-shrinkable multilayer film) was produced. The total thickness of the obtained heat-shrinkable multilayer film and the thickness of each layer are shown in Table 2.

Examples 2 and 3, and Comparative Examples 1 to 7

For Examples 2 and 3, and Comparative Examples 1 to 7, the tubular films 3f (heat-shrinkable multilayer film) after heat treatment were obtained in the same method as in Example 1 with the exception that the production conditions for the film were changed as described in Table 2. The total thickness of the obtained heat-shrinkable multilayer film and the thickness of each layer are shown in Table 2.

Evaluation of Heat-Shrinkable Multilayer Film

The puncture strength and 2.5% secant modulus of the heat-shrinkable multilayer films obtained in the Examples and Comparative Examples were measured by the following method. The puncture strength was measured from the first layer side and the sixth layer side of the film and the 2.5% secant modulus was measured in the machine direction (MD) and the transverse direction (TD) of the film. The results are shown in Table 2.

(1) Method for Measuring Puncture Strength

Using a tensilon universal material testing instrument ("RTC-1210" available from Orientec Co., Ltd.) equipped with a puncturing pin having a hemispherical tip with a radius of curvature of 0.5 mm, a sample multilayer film was punctured from the inner surface layer side with the puncturing pin at a speed of 50 mm/min in an atmosphere at 23° C., 50% RH. The value at the maximum point (N) until the film breaks was defined as the puncture strength from the inner surface layer side. A sample multilayer film was punctured from the outer surface layer side with the puncturing pin under the same condition as that described above. The value at the maximum point (N) until the film breaks was defined as the puncture strength from the outer surface layer side.

(2) Method for Measuring 2.5% Secant Modulus

A strip-shaped film sample with a width of 20 mm and a length of 150 mm was mounted on a tensilon universal material testing instrument (RTC-1210, available from Orientec Co., Ltd.) such that the distance between chucks was 100 mm, stretched at 23° C., 50% RH in the machine direction (MD) at a tensile test speed of 10 mm/min. Then, the stress at 2.5% elongation was measured. One sample was tested five times and the average value obtained by multiplying the obtained stress by 40 was defined as the 2.5% secant modulus in the machine direction (MD). The same measurement was also performed for the transverse direction (TD) and the 2.5% secant modulus in the transverse direction (TD) was determined.

TABLE 2

| | | First layer | Second layer | Third layer | Fourth layer | Fifth layer | Sixth layer | Stretching ratio (MD/TD) | Relaxation ratio (MD/TD) | Total thickness of film (μm) | Puncture strength (N) Outer surface layer side | Puncture strength (N) Inner surface layer side | 2.5% Secant modulus (MPa) MD | 2.5% Secant modulus (MPa) TD | Ratio of thickness of third layer to total thickness of film |
|---|---|---|---|---|---|---|---|---|---|---|---|---|---|---|---|
| Comparative Example 1 | Resin | Co-PET + MB-1 (88/12 wt.%) | ad | Ny6 + A-Ny (70/30 wt.%) | EVOH | ad | LLDPE + MB-2 (90/10 wt. %) | 2.7/3.1 | 7.5/7.5 | 90 | 36.6 | 32.3 | 672 | 651 | 0.32 |
| | Thickness (μm) | 3 | 3 | 29 | 3 | 3 | 49 | | | | | | | | |
| Comparative Example 2 | Resin | Co-PET + MB-1 | ad | Ny6-66 + A-Ny (85/15 wt. %) | EVOH | ad | LLDPE + MB-2 | 2.8/3.1 | 7.5/7.5 | 90 | 39.3 | 29.8 | 487 | 528 | 0.32 |
| | Thickness (μm) | 3 | 3 | 29 | 3 | 3 | 49 | | | | | | | | |
| Comparative Example 3 | Resin | Co-PET + MB-1 | ad | Ny6-66 + A-Ny (85/15 wt. %) | EVOH | ad | VLDPE1 + MB-2 | 3.1/3.1 | 10/10 | 90 | 36.4 | 29.9 | 608 | 593 | 0.32 |
| | Thickness (μm) | 3 | 3 | 29 | 3 | 3 | 49 | | | | | | | | |
| Comparative Example 4 | Resin | Co-PET + MB-1 | ad | Ny6-66 + A-Ny (85/15 wt. %) | EVOH | ad | VLDPE1 + MB-2 | 3.1/3.1 | 10/10 | 98 | 37.0 | 32.0 | 600 | 600 | 0.30 |
| | Thickness (μm) | 3 | 3 | 29 | 3 | 3 | 57 | | | | | | | | |
| Comparative Example 5 | Resin | Co-PET + MB-1 | ad | Ny6-66 + A-Ny (85/15 wt. %) | EVOH | ad | VLDPE1 + MB-2 | 3.1/3.1 | 10/10 | 90 | 30.0 | 20.0 | 520 | 520 | 0.28 |
| | Thickness (μm) | 3 | 3 | 25 | 3 | 3 | 53 | | | | | | | | |
| Comparative Example 6 | Resin | Co-PET + MB-1 | ad | Ny6-66 + A-Ny (85/15 wt. %) | EVOH | ad | VLDPE1 + MB-2 | 3.1/3.1 | 10/10 | 90 | 20.0 | 16.0 | 360 | 400 | 0.17 |
| | Thickness (μm) | 3 | 3 | 15 | 3 | 3 | 63 | | | | | | | | |
| Comparative Example 7 | Resin | Co-PET + MB-1 | ad | Ny6-66 + A-Ny (85/15 wt. %) | EVOH | ad | VLDPE1 + MB-2 | 2.8/3.1 | 7.5/7.5 | 90 | 28.0 | 20.0 | 480 | 480 | 0.26 |
| | Thickness (μm) | 3 | 3 | 23 | 3 | 3 | 58 | | | | | | | | |
| Example 1 | Resin | Co-PET + MB-1 | ad | Ny6-66 + A-Ny (85/15 wt. %) | EVOH | ad | VLDPE1 + MB-2 | 3.4/3.1 | 10/10 | 98 | 31.5 | 25.8 | 418 | 394 | 0.20 |
| | Thickness (μm) | 3 | 3 | 20 | 3 | 3 | 66 | | | | | | | | |
| Example 2 | Resin | Co-PET + MB-1 | ad | Ny6-66 + A-Ny (85/15 wt. %) | EVOH | ad | VLDPE1 + MB-2 | 3.4/3.1 | 10/10 | 98 | 36.0 | 24.6 | 498 | 494 | 0.26 |
| | Thickness (μm) | 3 | 3 | 25 | 3 | 3 | 61 | | | | | | | | |
| Example 3 | Resin | Co-PET + MB-1 | ad | Ny6-66 + A-Ny (85/15 wt. %) | EVOH | ad | VLDPE2 + MB-2 | 3.4/3.1 | 7.5/7.5 | 98 | 40.0 | 33.1 | 401 | 447 | 0.26 |
| | Thickness (μm) | 3 | 3 | 25 | 3 | 3 | 61 | | | | | | | | |

From the results shown in Table 2, it was confirmed that the heat-shrinkable multilayer film, wherein the total thickness of the heat-shrinkable multilayer film was from 95 to 160 μm; the thickness of the third layer, that is, the intermediate layer including a polyamide resin was from 19 to 35 μm; the thickness of the sixth layer, that is, the inner surface layer was 59 μm or greater; and the ratio of the thickness of the intermediate layer including a polyamide resin to the total thickness of the heat-shrinkable multilayer film was from 18 to 29%, had a large puncture strength, which was an indicator of film strength, high strength and low 2.5% secant modulus which was an indicator of flexibility, and therefore excelled in flexibility.

INDUSTRIAL APPLICABILITY

The heat-shrinkable multilayer film of the present invention can be applied to techniques in which a heat-shrinkable multilayer film is formed into a bag or pouch by a bag-forming machine and then filled with contents, or either the contents as is or the contents loaded on a tray are automatically packaged during bag-forming processing. The heat-shrinkable multilayer film of the present invention can be widely used as packaging materials for foods such as fresh meat, ham, and sausages, and other products, and materials for a packaging machine.

REFERENCE SIGNS LIST

1 Extruder
2 Annular die
3a, 3b Tubular body
3c, 3d, 3e, 3f Tubular film
4 Water bath
5, 7, 8, 10, 11 Pinch roller
6 Hot water bath
9 Cooling airring
12 Heat treatment cylinder
13 Nozzle
14 Winding roller

The invention claimed is:

1. A heat-shrinkable multilayer film consisting of:
an outer surface layer including an aromatic polyester resin;
a first adhesive resin;
an intermediate layer including a polyamide resin;
a barrier layer comprising EVOH;
a second adhesive resin; and
an inner surface layer including a sealable resin comprising a polyethylene resin;
wherein
the polyamide resin constituting the intermediate layer is a mixture of 88 to 86 wt. % of nylon 6-66 and 12 to 14 wt. % of nylon 6I-6T;
a total thickness of the heat-shrinkable multilayer film is from 95 to 160 μm;
a thickness of the intermediate layer including the polyamide resin is from 17 to 47 μm;
a thickness of the inner surface layer is 55 μm to 87 μm;
a ratio of the thickness of the intermediate layer including the polyamide resin to the total thickness of the heat-shrinkable multilayer film is from 18 to 29%, and
the heat-shrinkable multilayer film being laminated in the order of the outer surface layer comprising the aromatic polyester resin, the first adhesive resin, the intermediate layer comprising the polyamide resin, the barrier layer comprising the EVOH, the second adhesive resin, and the inner surface layer comprising the polyethylene resin.

2. The heat-shrinkable multilayer film according to claim 1, wherein a puncture strength from an inner surface layer side at 23° C. and 50% RH is 21 N or greater; and
a 2.5% secant modulus in both the machine direction (MD) and the transverse direction (TD) is from 100 to 520 MPa.

3. The heat-shrinkable multilayer film according to claim 1, wherein the heat-shrinkable multilayer film is used for packaging.

4. A heat-shrinkable multilayer film consisting of:
an outer surface layer including an aromatic polyester resin;
a first adhesive resin;
an intermediate layer including a polyamide resin;
a barrier layer comprising EVOH;
a second adhesive resin; and
an inner surface layer including a sealable resin comprising a polyethylene resin;
wherein
the polyamide resin constituting the intermediate layer is a mixture of 85 wt. % of nylon 6-66 and 15 wt. % of nylon 6I-6T;
a thickness of the intermediate layer including the polyamide resin is from 19 to 41 μm;
a total thickness of the heat-shrinkable multilayer film is from 95 to 140 μm;
a ratio of the thickness of the intermediate layer including the polyamide resin to the total thickness of the heat-shrinkable multilayer film is 26%, and
the heat-shrinkable multilayer film being laminated in the order of the outer surface layer comprising the aromatic polyester resin, the first adhesive resin, the intermediate layer comprising the polyamide resin, the barrier layer comprising the EVOH, the second adhesive resin, and the inner surface layer comprising the polyethylene resin.

5. The heat-shrinkable multilayer film according to claim 1 or 4,
the heat-shrinkable multilayer film being obtained by co-extruding at least three types of molten thermoplastic resins into a tubular body, rapidly cooling the tubular body in a water bath, passing the film-shaped tubular body through a warm water bath and reheating the film-shaped tubular body, simultaneously biaxially stretching the bubble-shaped tubular film at a draw ratio of 3.4 times in the longitudinal direction (MD) and 3.1 times in the transverse direction (TD), and relaxing the tubular film at 68° C. by 7.5% to 10.0% in the longitudinal direction (MD) and 7.5% to 10.0% in the transverse direction (TD).

6. The heat-shrinkable multilayer film according to claim 1, wherein the first adhesive resin comprises a maleic anhydride-modified polyolefin.

7. The heat-shrinkable multilayer film according to claim 4, wherein the first adhesive resin comprises a maleic anhydride-modified polyolefin.

8. The heat-shrinkable multilayer film according to claim 1, wherein in the inner surface layer, the polyethylene resin comprises a very low density polyethylene (VLDPE).

9. The heat-shrinkable multilayer film according to claim 4, wherein in the inner surface layer, the polyethylene resin comprises a very low density polyethylene (VLDPE).

10. The heat-shrinkable multilayer film according to claim 8, wherein the very low density polyethylene (VLDPE) comprises a grade corresponding to (i) a density (g/cm³) of 0.912 and a melt index (g/10 min) of 1, or (ii) a density (g/cm³) of 0.911 and a melt index (g/10 min) of 3.3.

11. The heat-shrinkable multilayer film according to claim 9, wherein the very low density polyethylene (VLDPE) comprises a grade corresponding to (i) a density (g/cm³) of 0.912 and a melt index (g/10 min) of 1, or (ii) a density (g/cm³) of 0.911 and a melt index (g/10 min) of 3.3.

12. The heat-shrinkable multilayer film according to claim 1, wherein a thickness of the inner surface layer is 61 µm to 66 µm.

\* \* \* \* \*